United States Patent [19]

Mullican

[11] Patent Number: 4,718,583
[45] Date of Patent: Jan. 12, 1988

[54] PORTABLE LUGGAGE CARRIER FOR PICKUP TRUCKS

[76] Inventor: Randall Mullican, 8201 Brentwood Ave., Lubbock, Tex. 79424

[21] Appl. No.: 918,843

[22] Filed: Oct. 14, 1986

[51] Int. Cl.[4] ................................. B60R 9/00
[52] U.S. Cl. ........................ 224/42.42 R; 224/273; 224/327; 224/328; 206/527; 296/37.6; 383/38
[58] Field of Search ............... 224/273, 42.42 R, 327, 224/328; 383/38; 296/37.6, 24 R; 206/527

[56] References Cited

U.S. PATENT DOCUMENTS

| | | | |
|---|---|---|---|
| 2,729,499 | 1/1956 | Eggum | 224/42.42 R |
| 3,000,418 | 9/1961 | Bitting | 152/52 R |
| 3,393,845 | 7/1968 | Gilbreath | 224/318 |
| 3,473,713 | 10/1969 | Campbell | 224/42.01 |
| 4,050,614 | 9/1977 | Simpson | 224/328 |
| 4,160,496 | 7/1979 | Knight | 190/107 |
| 4,210,230 | 7/1980 | Weisner | 190/107 |
| 4,451,075 | 5/1984 | Canfield | 296/37.6 |
| 4,506,870 | 3/1985 | Penn | 224/42.42 R |
| 4,573,202 | 2/1986 | Lee | 383/3 |
| 4,580,827 | 4/1986 | Feagan | 296/37.6 |

*Primary Examiner*—Houston S. Bell, Jr.
*Attorney, Agent, or Firm*—Munson H. Lane, Jr.

[57] ABSTRACT

A lightweight water-resistant portable luggage carrier for pickup trucks that is securely locked in the bed of a pickup truck to be used to carry luggage. It is flexible and can be easily and quickly removed and compacted into a portable size to be stored behind a pickup seat.

5 Claims, 6 Drawing Figures

U.S. Patent  Jan. 12, 1988  4,718,583
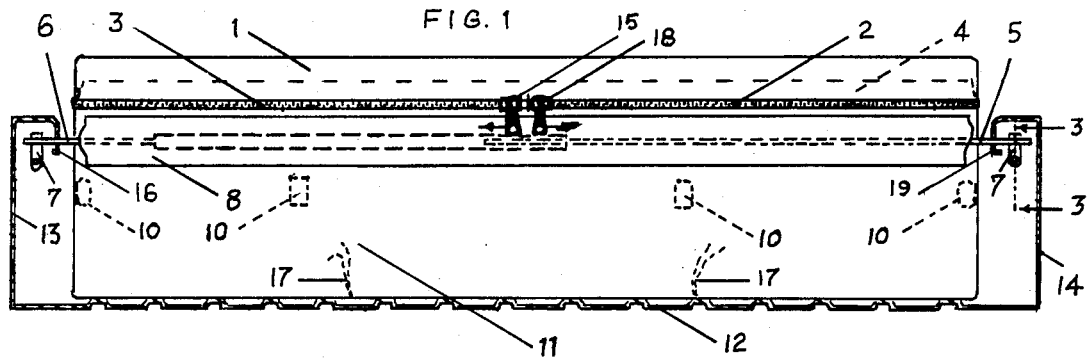
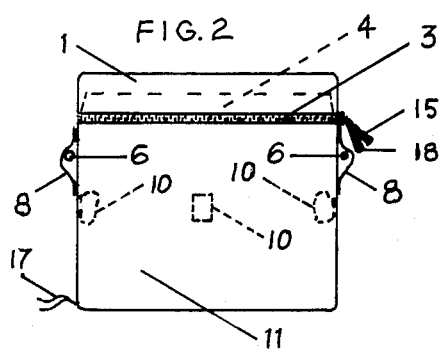 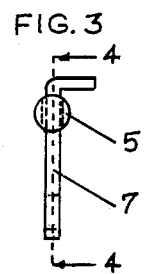 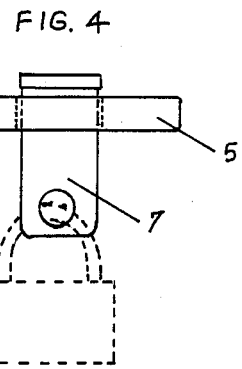
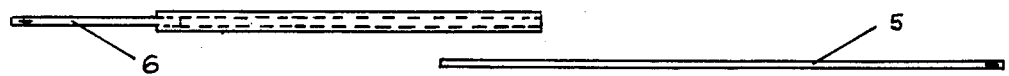
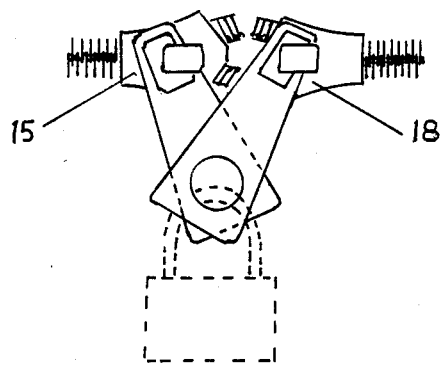

PORTABLE LUGGAGE CARRIER FOR PICKUP TRUCKS

BACKGROUND OF THE INVENTION

1. Field of the Invention

The invention relates generally to a portable luggage carrying device attached to the bed of a pickup truck.

2. Description of the Prior Art

Pickup trucks are used by many as a primary source of travel. The problem is there is no protective luggage area on most pickup trucks. What is needed is a temporary luggage carrier which can be easily removed when not in use, allowing full use of the truck bed for other uses. This invention eliminates the problem.

SUMMARY OF THE INVENTION

The invention relates to a portable device for carrying luggage in the bed of a pickup truck. It comprises a means for removably attaching and locking the invention to the pickup bed.

The principal object of the invention is to provide a means of protecting luggage in a pickup truck bed from the elements of the weather.

Another object of the invention is to provide a means of stabilizing luggage in a pickup truck bed.

Other objects of the invention are to provide a device which is easily installed or removed and is compactable to a size which may be stored behind a pickup truck seat.

BRIEF DESCRIPTION OF THE DRAWINGS

FIG. 1 is a front view of the portable luggage carrier for pickup trucks positioned within a rear view cross section of the inside panels and floor of a pickup truck bed.

FIG. 2 is a left-end view of the portable luggage carrier for pickup trucks.

FIG. 3 is an enlarged sectional view along Section 3—3 of FIG. 1.

FIG. 4 is a sectional view along 4—4 of FIG. 3.

FIG. 5 is a top view of support rod 5 and 6 of FIG. 1, showing rods not joined.

FIG. 6 is an enlarged view of 15 and 18 of FIG. 1.

DESCRIPTION OF THE PREFERRED EMBODIMENT

Referring to FIG. 1, an embodiment of the invention is shown in which the portable luggage carrier for pickup trucks is shown attached to a cross sectional view of a pickup truck bed 12, 13, 14, 16, and 19, the vertical inside lips 16 and 19 of the left-hand panel 13 and the right-hand panel 14, and the floor 12 of the bed.

Referring to FIGS. 1, 2, and 6, an embodiment of the invention being a rectangular shaped flexible bag with a flexible lid 1 separated from the bottom member 11 by two zippers 2 and 3, each said zipper continuous from the middle of the front to the corresponding rear corners. The zippers 2 and 3 are in a closed position when the pulls 15 and 18 are in the middle. When in this position the pulls 15 and 18 are ready to be locked together. The rear edge of the lid 1 and the lower back side of the flexible bag 11 are not zippered. They are attached and simply bend when the zippers 2 and 3 are in an open position and the lid 1 is raised. The flexible bag has loops 10 attached inside for the purpose of securing luggage with cord, rope, or any other satisfactory means of tying. There are two casings 8 attached the entire length on the outside front and back of the flexible bag. To prevent water which could leak through the zippers from reaching the contents, the lower portion of the flexible bag 11 extends upward behind the zippers to form a lip 4 behind the entire length of the zippers 2 and 3.

Referring to FIG. 5, support rod member 5 is inserted into support rod member 6 to make an adjustable support rod (two required). Referring to FIGS. 1 and 2, the said support rods are inserted into and beyond both ends of the front and back casings 8. The support rods 5 and 6 are inserted into and beyond pre-drilled holes in the vertical lips 16 and 19 of the pickup bed. Referring to FIGS. 1, 3, 4, and 5, the support rod ends 5 and 6 have slots in their outer ends. Referring to FIGS. 1, 3, and 4, by inserting locking clips 7 into slotted ends, the portable luggage carrier for pickup trucks is ready to lock in place.

Referring to FIGS. 1 and 2, the casings 8 are positioned to allow the portable luggage carrier for pickup trucks to set firmly on the pickup bed 12 so the luggage weight is not supported on the support rods 5 and 6. The rods are to support the lower part of the flexible bag 11.

Referring to FIGS. 1 and 2, there are tie strings 17 attached to the back side of the lower part of the flexible bag 11 to tie around each end of the portable luggage carrier for pickup trucks when folded and rolled up into portable configuration. Also as seen in FIGS. 1 and 2, a plurality of tie-down loops 10 are attached to the inside of the flexible bag.

While a specific form of the invention has been described and illustrated herein, it is to be understood that the same may be varied within the scope of the appended claims without departing from the spirit of the invention.

I claim:

1. A portable luggage carrier for mounting transversely in the open bed of a pickup truck which has a floor and a pair of upright side panels extending along opposite longitudinal sides of said floor and at least two pair of longitudinally spaced transversely aligned holes in said upright panels adjacent to the upper edges thereof, said portable luggage carrier comprising a flexible elongated bag having a lid, a bottom, front and back longitudinal side walls and a pair of opposite end walls connected to said bottom and extending upwardly therefrom forming a continuous enclosure about said bottom, said side walls each having an upper edge, a tubular casing attached to each of said side walls adjacent to and parallel to the upper edge thereof, a pair of telescoping support rods, therebeing one support rod extending longitudinally through each of said casings with opposite ends projecting outwardly of the opposite ends of said casing, each of said support rods being adjustable in length so that the opposite ends thereof may be extended through one of said two pair of transversely aligned holes in said side panels for supporting said flexible bag from said side panels.

2. The portable luggage carrier for pick-up trucks as defined in claim 1 together with means for locking said support rods to said side panels of a pickup truck.

3. The portable luggage carrier for pickup trucks as defined in claim 1, together with tie-down loops attached to the inside of said flexible bag.

4. The portable luggage carrier for pickup trucks as defined in claim 1 together with tie strings attached exteriorly of said flexible bag for tying around the flexible bag when folded and rolled in collapsed condition.

5. The portable luggage carrier for pickup trucks as defined in claim 1 wherein said lid is attached to the upper edges of said front and back side walls and of said opposite end walls by two separate zippers, said zippers each having pulls and being positioned with the pulls nearly touching when the zippers are closed.

* * * * *